United States Patent
Walker et al.

(10) Patent No.: US 9,469,773 B2
(45) Date of Patent: Oct. 18, 2016

(54) INK COMPOSITION FOR MAKING A CONDUCTIVE SILVER STRUCTURE

(71) Applicant: The Board of Trustees of the University of Illinois, Urbana, IL (US)

(72) Inventors: Steven B. Walker, Champaign, IL (US); Jennifer A. Lewis, Cambridge, MA (US)

(73) Assignee: The Board of Trustees of The University of Illinois, Urbana, IL (US)

( * ) Notice: Subject to any disclaimer, the term of this patent is extended or adjusted under 35 U.S.C. 154(b) by 0 days.

(21) Appl. No.: 14/368,202

(22) PCT Filed: Dec. 20, 2012

(86) PCT No.: PCT/US2012/071034
§ 371 (c)(1),
(2) Date: Jun. 23, 2014

(87) PCT Pub. No.: WO2013/096664
PCT Pub. Date: Jun. 27, 2013

(65) Prior Publication Data
US 2015/0004325 A1    Jan. 1, 2015

Related U.S. Application Data

(60) Provisional application No. 61/579,845, filed on Dec. 23, 2011.

(51) Int. Cl.
*C09D 11/52*    (2014.01)
*C23C 18/42*    (2006.01)
(Continued)

(52) U.S. Cl.
CPC .............. *C09D 11/52* (2013.01); *B05D 1/005* (2013.01); *B05D 1/04* (2013.01); *B05D 1/18* (2013.01); *C23C 18/168* (2013.01); *C23C 18/42* (2013.01); *C23C 26/02* (2013.01)

(58) Field of Classification Search
CPC ..... C09D 11/52; C23C 18/168; C23C 18/42; B05D 1/005; B05D 1/04; B05D 1/18
USPC ............... 106/31.92; 252/514, 519.2, 519.21
See application file for complete search history.

(56) References Cited

U.S. PATENT DOCUMENTS 8,021,580 B2    9/2011    Ueda et al.
8,066,805 B2    11/2011    Zurcher et al.
(Continued)

FOREIGN PATENT DOCUMENTS

DE    102005038208 A1    2/2007
EP    2156911 A1    2/2010
(Continued)

OTHER PUBLICATIONS

English translation of JP 2009/197133; Sep. 2009; 26 pages.*
(Continued)

*Primary Examiner* — Helene Klemanski
(74) *Attorney, Agent, or Firm* — Brinks Gilson & Lione

(57) ABSTRACT

An ink composition for making a conductive silver structure comprises a silver salt and a complex of (a) a complexing agent and a short chain carboxylic acid or (b) a complexing agent and a salt of a short chain carboxylic acid, according to one embodiment. A method for making a silver structure entails combining a silver salt and a complexing agent, and then adding a short chain carboxylic acid or a salt of the short chain carboxylic acid to the combined silver salt and a complexing agent to form an ink composition. A concentration of the complexing agent in the ink composition is reduced to form a concentrated formulation, and the silver salt is reduced to form a conductive silver structure, where the concentrated formulation and the conductive silver structure are formed at a temperature of about 120° C. or less.

24 Claims, 14 Drawing Sheets

(51) Int. Cl.
| | |
|---|---|
| B05D 1/04 | (2006.01) |
| B05D 1/18 | (2006.01) |
| B05D 1/00 | (2006.01) |
| C23C 18/16 | (2006.01) |
| C23C 26/02 | (2006.01) |

(56) References Cited

U.S. PATENT DOCUMENTS

| | | | |
|---|---|---|---|
| 2003/0164105 A1 | 9/2003 | Tashiro | |
| 2004/0026258 A1 | 2/2004 | No et al. | |
| 2005/0006339 A1 | 1/2005 | Mardilovich et al. | |
| 2006/0130700 A1 | 6/2006 | Reinartz | |
| 2008/0145560 A1* | 6/2008 | Khaselev | C09D 11/52 252/514 |
| 2009/0031856 A1* | 2/2009 | Lee | B22F 9/24 75/343 |
| 2009/0120800 A1 | 5/2009 | Chung et al. | |
| 2009/0209693 A1 | 8/2009 | Suganuma et al. | |
| 2010/0037731 A1 | 2/2010 | Li | |
| 2010/0143591 A1* | 6/2010 | Wu | C09D 11/52 427/256 |
| 2010/0166948 A1 | 7/2010 | Cho et al. | |
| 2010/0189901 A1 | 7/2010 | Chung et al. | |
| 2010/0247870 A1 | 9/2010 | Suzuki et al. | |
| 2011/0005428 A1 | 1/2011 | Heo et al. | |
| 2011/0059234 A1 | 3/2011 | Byun et al. | |
| 2011/0232527 A1 | 9/2011 | Kang et al. | |
| 2012/0168684 A1 | 7/2012 | Magdassi et al. | |
| 2013/0082217 A1* | 4/2013 | Kang | C09D 11/52 106/31.92 |
| 2013/0121872 A1* | 5/2013 | Matsumoto | C09D 11/52 252/519.21 |
| 2013/0334470 A1* | 12/2013 | Kurihara | C09D 11/52 252/514 |
| 2014/0346412 A1* | 11/2014 | Okamoto | B22F 9/30 252/514 |
| 2015/0001452 A1* | 1/2015 | Kurihara | C09D 11/52 252/514 |
| 2015/0004325 A1 | 1/2015 | Walker et al. | |

FOREIGN PATENT DOCUMENTS

| | | | |
|---|---|---|---|
| JP | 2009/197133 | * | 9/2009 |
| JP | 2011-34750 | | 2/2011 |
| JP | 2012/052225 | * | 3/2012 |
| KR | 20110058307 A | | 6/2011 |
| WO | WO 03/106573 A1 | | 12/2003 |
| WO | WO 2011/126706 A2 | | 10/2011 |
| WO | WO 2012/168941 A1 | | 12/2012 |

OTHER PUBLICATIONS

English translation of JP 2012/052225; Mar. 2012; 28 pages.*
Extended European Search Report for corresponding European application 12859006.4, mailed Apr. 3, 2015.
Supplementary European Search Report for corresponding European application 12859006.4, mailed May 20, 2015.
International Search Report for International application No. PCT/us2012/071034, dated Mar. 8, 2013.
Written Opinion of the International Searching Authority for International application No. PCT/US2012/071034, dated Mar. 8, 2013.
International Preliminary Report on Patentability for International application No. PCT/US2012/071034, dated Jun. 24, 2014.
Analisa Russo, et al., "Pen-on-Paper Flexible Electronics," *Advanced Materials* 2011, 23, 3426-3430.
S. Brett Walker, et al., "Reactive Silver Inks for Patterning High-Conductivity Features at Mild Temperatures," 2011, Journal of the American Chemical Society, pubs.acs.org/JACS.
Hussain, et al., "Silver nanoparticles: preparation, characterization, and kinetics," *Advanced Materials Letters*, Published online by VBRI press 2011, 2(3), pp. 188-194.
Shanley, et al., "The Chemistry and Free Energy of Formation of Silver Nitride," *Ind. Eng. Chem. Res.* 1991, 30, pp. 2503-2506.
Won, et al., "Preparation of porous silver particles using ammonium formate and its formation mechanism," *Chemical Engineering Journal 156*, 2010, pp. 459-464.
Office Action issued Aug. 9, 2016, for corresponding Japanese application 2014-548905 (with Japanese Office Action and English translation).

* cited by examiner

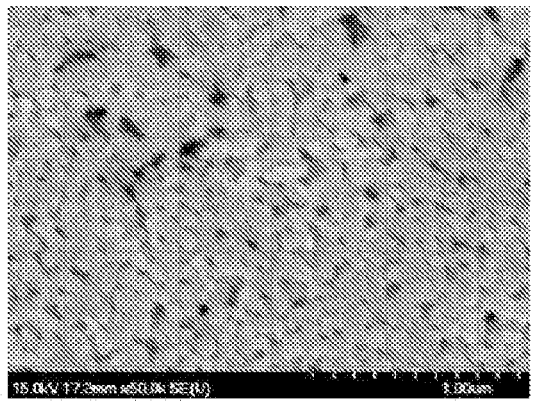
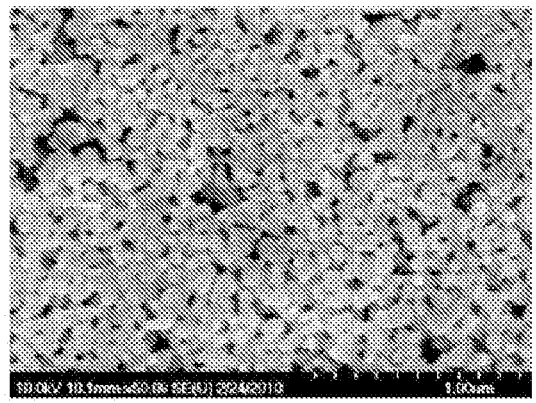
Figure 1                    Figure 2
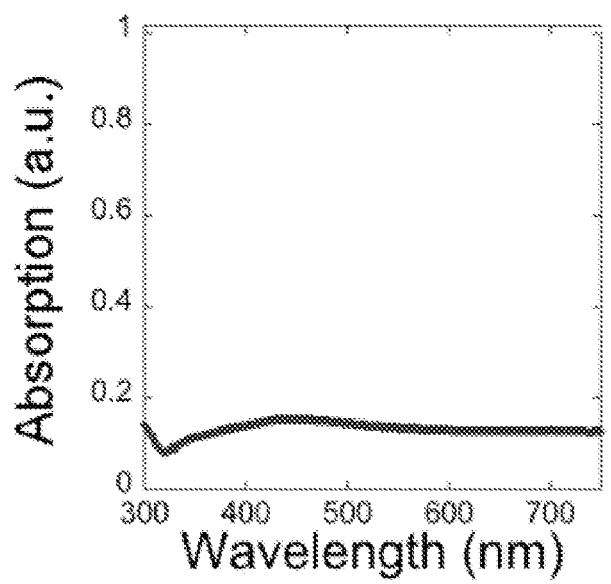
Figure 3

US 9,469,773 B2

INK COMPOSITION FOR MAKING A CONDUCTIVE SILVER STRUCTURE

FEDERALLY FUNDED RESEARCH OR DEVELOPMENT

The subject matter of the present disclosure was developed with the support of the U.S. Department of Energy, Materials Sciences and Engineering Division, under Award No. DEFG-02-07ER46471 and the NSF Center for Nanoscale Chemical-Electrical Mechanical Manufacturing Systems, under Grant No. DMI-0328162. The U.S. Government has certain rights in this invention.

This application is the national phase application of PCT Application No. PCT/US2012/071034, filed Dec. 20, 2012, which claims the benefit of U.S. Provisional Application No. 61/579,845, filed Dec. 23,2011, the entirety of Which is hereby incorporated by reference.

TECHNICAL FIELD

The present disclosure is related generally to ink compositions and more particularly to silver-based inks that may be deposited to form highly conductive coatings or patterns.

BACKGROUND

Printed electronics offer an attractive alternative to conventional technologies by enabling the creation of large-area, flexible devices at low cost. There are a plethora of applications for high-conductivity materials with fine-scale features in modern electronics such as solar cell electrodes, flexible displays, radio frequency identification tags, antennas, and many more. In efforts to make these high-technology devices increasingly affordable, the substrates used typically have relatively little temperature resilience and require low processing temperatures to maintain integrity.

The vast majority of commercially produced conductive inks are specifically designed for inkjet, screen-printing, or roll-to-roll processing methods in order to process large areas with fine-scale features in short time periods. These inks have disparate viscosities and synthesis parameters. Particle-based inks are based on conductive metal particles, which are typically synthesized separately and then incorporated into an ink formulation. The resulting ink is then tuned for the specific particle process. Precursor-based inks are based on thermally unstable precursor complexes that reduce to a conductive metal upon heating. Prior particle- and precursor-based methods generally rely on high temperatures to form conductive coatings and thus may not be compatible with substrates that require low processing temperatures to maintain integrity. For example, silver compounds with carbamate or other relatively low molecular weight ligands (compared to polymer stabilizers) have been synthesized that decompose at temperatures near 150° C., yielding electrical conductivities approaching that of bulk silver. Unfortunately, even these temperatures render the ink incompatible with many plastic and paper substrates used in flexible electronic and biomedical devices.

BRIEF SUMMARY

An improved ink composition for forming a conductive silver structure and a method of making a conductive silver structure are described herein.

According to one embodiment, the ink composition comprises a silver salt and a complex of a complexing agent and a short chain carboxylic acid or a salt of the short chain carboxylic acid.

According to another embodiment, the ink composition comprises a silver salt and a complexing agent for dissolving the silver salt, where the complexing agent is not a reducing agent for the silver salt. The ink composition also includes an acid for complexing with the complexing agent and for reducing the silver salt, where each of the complexing agent and the acid has a boiling point of about 120° C. or less.

The method entails combining a silver salt and a complexing agent, and then adding a short chain carboxylic acid or a salt of the short chain carboxylic acid to the combined silver salt and complexing agent to form an ink composition. A concentration of the complexing agent in the ink composition is reduced to form a concentrated formulation, and the silver salt is reduced to form a conductive silver structure, where the concentrated formulation and the conductive silver structure are formed at a temperature of about 120° C. or less.

BRIEF DESCRIPTION OF THE DRAWINGS

FIG. 1 shows an exemplary silver structure formed after 48 hours at room temperature;

FIG. 2 shows another exemplary silver structure formed after 24 hours at 65° C.;

FIG. 3 shows UV/Vis spectrophotometry data for one exemplary reactive silver ink;

DETAILED DESCRIPTION

Figure 4:
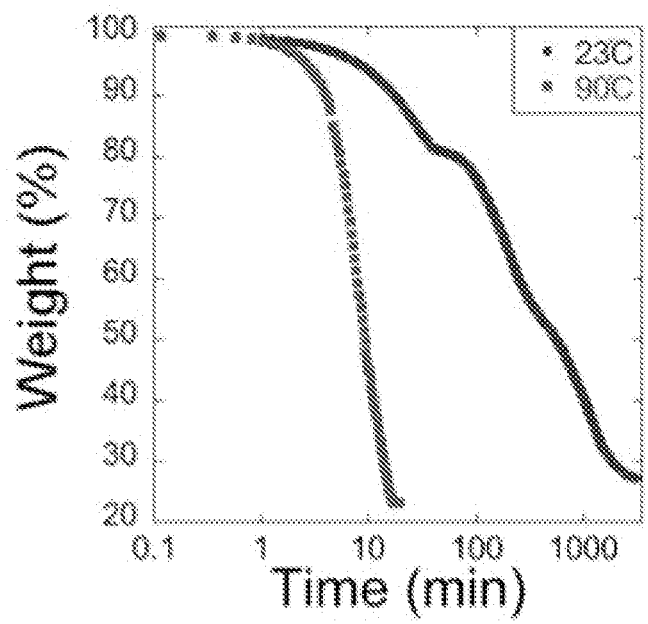
FIG. 4 shows isothermal gravimetric analysis data for one exemplary reactive silver ink.

The inventors have recognized that a desirable ink design may have one or more of the following characteristics. First, the ink synthesis procedure may be both simple and high-yield. Second, the ink may possess low viscosity so that it is compatible with a broad range of patterning techniques, including direct ink writing, inkjet printing, and airbrush spraying. Third, the patterned features may be highly conductive at room temperature and achieve bulk conductivity upon annealing at mild temperatures (e.g., <100° C.). Finally, the ink may remain stable at room temperature for months without particle precipitation.

Accordingly, a conductive ink composition (also referred to as a "conductive ink" or an "ink") has been created for printing highly conductive features (>$10^4$ S/cm) at room temperature. Such inks may be stable, particle-free, and suitable for a wide range of patterning techniques. The conductive ink composition may be highly transparent and can be printed through highly flexible, ultrafine nozzles (e.g., 100 nm diameter) via direct ink writing. Upon annealing at 90° C., printed electrodes prepared from such inks may exhibit an electrical conductivity equivalent to bulk silver.

The conductive ink is formed from a silver salt, a complexing agent (e.g., an alkyl amine, or ammonia) that acts as a weak base, and a short-chain carboxylic acid that acts as a reducing agent and a weak acid. In some examples, a salt of the short chain carboxylic acid may be used instead of or in addition to the short chain carboxylic acid. Preferably, the salt of the short chain carboxylic acid may be an ammonium salt of the short chain carboxylic acid. The conductive ink serves as a precursor for the fabrication of highly conductive silver coatings, lines and patterns. Due to the low boiling points of the non-silver components, the conductive ink may be processed at low temperatures and can be engineered for compatibility with multiple processing techniques (e.g., ink jet printing, aerosol jet printing, screen-printing, roll-to-roll printing, direct ink writing, electrohydrodynamic jet (e-jet) printing, dip-coating, spin-coating, and spray processing such as airbrush). Without wishing to be bound by theory, the preparation of the ink takes advantage of an acid-base complex formed between the complexing agent and the short chain carboxylic acid and the fact that each of the complexing agent, the short chain carboxylic acid, and the optional solvent has a boiling point of at most 120° C.

Silver salt is employed in the ink as a precursor material, which ultimately yields the silver in the conductive silver coatings, lines or patterns. Any suitable silver precursor may be used and preferably comprises Ag(I) or the +1 oxidation state. Silver salts comprise a ligand, and it is preferable that the conjugate acid of the ligand has a boiling point of at most 120° C. such that the conjugate acid of the ligand can be removed under mild conditions during the processing of the conductive ink. For example, the silver salt may be silver acetate, silver formate, silver carbonate, silver fluoride, silver nitrate, silver nitrite, silver chloride, silver bromide, silver iodide, silver phosphate, silver trifluoroacetate, silver acetylacetonate, silver sulfate, or silver oxide. Preferably the silver salt is silver acetate. The conjugate acid of the acetate ligand is acetic acid, which has a boiling point of about 117-118° C.

In one embodiment, the complexing agent is an alkyl amine. To form the conductive ink, the silver salt is dissolved in the alkyl amine. An alkyl amine is an amino group substituted by at least one $C_{1-8}$ alkyl group, where an alkyl group refers to a hydrocarbon group which may be linear, cyclic, or branched or a combination thereof having the number of carbon atoms designated (i.e., $C_{1-8}$ means one to eight carbon atoms). Examples of alkyl groups include methyl, ethyl, n-propyl, isopropyl, n-butyl, t-butyl, isobutyl, sec-butyl, pentyl, isopentyl, cyclohexyl, cyclopentyl, and the like. An alkyl amine may be a primary, secondary or tertiary amine, preferably a primary amine.

The alkyl amine, which is a weak base, acts as a stabilizer and solvent for the silver salt. The alkyl amine is not intended to act as a reducing agent for the silver salt (i.e., does not appreciably reduce the silver salt). Any suitable alkyl amine that stabilizes the silver salt may be employed. Preferably, the alkyl amine has a boiling point of about 120° C. or less. Examples of alkyl amines having a boiling point of about 120° C. or less include but are not limited to isomers of $C_6H_{15}N$, isomers of $C_5H_{13}N$, isomers of $C_4H_{11}N$, isomers of $C_3H_9N$, isomers of $C_2H_7N$, and isomers of $CH_5N$. For convenience in handling, it may be desirable for the alkyl amine to have a boiling point of about 40° C. or greater. Examples of alkyl amines having boiling points between about 40° C. and 120° C. include, but are not limited to propylamine, n-butyl amine, amylamine, s-butylamine, diethylamine, triethylamine, iso-butylamine, iso-pentylamine, 1-methylbutylamine, 1-amino-2-methylbutane, and N-methyldiethylamine. Preferably the amine is propylamine, n-butyl amine, or amylamine; more preferably propylamine or n-butylamine.

The alkyl amine may be selected based on its boiling point for a specific application. For deposition methods such as inkjet printing or e-jet, greater stability is generally preferred, and thus it may be preferable to use an alkyl amine with a higher boiling point such as amyl amine which has a boiling point of about 104° C. In some aspects it may be desirable to add a short chain diamine (e.g., methylenediamine or ethylenediamine) in addition to the alkyl amine to provide even more stability. However, when ethylenediamine is used alone, the electrical conductivity of the resulting silver product may not be as high as desired. Therefore, it may be advantageous to employ a combination of an alkyl amine and ethylenediamine, such as amyl amine with ethylenediamine in a given ratio to prepare the silver-based ink. The ratio of alkyl amine to ethylenediamine may fall in the range from about 4:1 to about 1:4 on a volume:volume basis, and is more preferably about 1:1. Another short chain diamine such as, for example, methylenediamine may be used instead of or in addition to ethylenediamine.

To form the conductive ink, enough alkyl amine may be added such that the short chain carboxylic acid forms a complex with the alkyl amine. Without wishing to be bound by theory, the complex is believed to be formed via an acid base reaction between the short chain carboxylic acid and the alkyl amine. In short, a quaternary ammonium reaction product is formed by the reaction of the short chain carboxylic acid and the alkyl amine. Preferably an excess of alkyl amine is used relative to the short chain carboxylic acid to ensure that the short chain carboxylic acid is complexed and thereby unavailable to act as a reducing agent. The molar ratio of the alkyl amine to the short chain carboxylic acid is at least about 1:1, preferably at least about 2:1, more preferably at least about 4:1. For ease of operability, it may be desirable to add enough amine to dissolve the silver salt. The amount of alkyl amine required may be determined by slowly adding the alkyl amine to the silver salt and monitoring the dissolution of the silver salt. In some aspects, about 2 mL of alkyl amine may be used to dissolve about 1 g of silver salt. Other methods known to one skilled in the art to assist in dissolution of the silver salt including addition of a solvent or other component such as a higher molecular weight alkyl amine or a diamine to assist in dissolution are also contemplated.

In some aspects, it may be desirable to add a solvent to the mixture of the alkyl amine and silver salt. The solvent preferably has a boiling point of at most 120° C. Examples of suitable solvents include water, alcohols (including for example, methanol, ethanol, 1-propanol and 2-propanol), esters, ketones, and ethers. Preferably the solvent is water, ethanol, butanol, or propylene glycol. In some aspects, the solvent may include two or more co-solvents. For example, the solvent may include water and another co-solvent such as butanol or propylene glycol.

In another embodiment, the complexing agent is ammonium hydroxide (e.g., ammonia or aqueous ammonia). To form the conductive ink, the silver salt is dissolved in the ammonium hydroxide. The ammonium hydroxide, which is a weak base, acts as a stabilizer and solvent for the silver salt. The ammonium hydroxide is not intended to act as a reducing agent for the silver salt (i.e., does not appreciably reduce the silver salt).

To form the conductive ink, enough ammonium hydroxide may be added such that the short chain carboxylic acid forms a complex with the ammonium hydroxide. Without wishing to be bound by theory, the complex is believed to be formed via an acid base reaction between the short chain carboxylic acid and the ammonium hydroxide. An excess of ammonium hydroxide may be used relative to the short chain carboxylic acid such that the short chain carboxylic acid is complexed and thereby unavailable to act as a reducing agent. The excess ammonia in solution acts to preferentially complex with formic acid resulting in the in situ synthesis of ammonium formate. The molar ratio of the ammonium hydroxide to the short chain carboxylic acid may be at least about 1:1, preferably at least about 2:1, more preferably at least about 4:1. For ease of operability, it may be desirable to add enough ammonium hydroxide to dissolve the silver salt. The amount of ammonium hydroxide required may be determined by slowly adding the ammonium hydroxide to the silver salt and monitoring the dissolution of the silver salt. In some aspects, about 2.5 mL of ammonium hydroxide may be used to dissolve about 1 g of silver salt. Other methods known to one skilled in the art to assist in dissolution of the silver salt are also contemplated.

In some aspects, it may be desirable to add a solvent to the mixture of the ammonium hydroxide and silver salt. The solvent preferably has a boiling point of at most 120° C. Examples of suitable solvents include water, alcohols (including for example, methanol, ethanol, 1-propanol and 2-propanol), esters, ketones, and ethers. Preferably the solvent is water or ethanol.

In any of the embodiments described herein, preferably, after dissolving the silver salt in the complexing agent, the short chain carboxylic acid is added to form an ink formulation. The short chain carboxylic acid functions as the reducing agent for the silver salt. Alternatively, or additionally, a salt (e.g., the ammonium salt) of the short chain carboxylic acid may be added to form the ink formulation. The salt of the short chain carboxylic acid may function as the reducing agent for the silver salt, generally as described herein with reference to the short chain carboxylic acid. Without wishing to be bound by theory, it is believed that by adding the short chain carboxylic acid in the presence of the complexing agent, an acid-base complex is formed between the short chain carboxylic acid and the complexing agent, thereby preventing the short chain carboxylic acid from reducing the silver salt immediately. As the ink formulation is concentrated and the complexing agent is removed by suitable conditions including evaporation, the short chain carboxylic acid becomes liberated and reduction of the silver salt to elemental silver (silver in the zero oxidation state) by the short chain carboxylic acid may occur. Preferably, particle formation may only occur after patterning, as evaporation ensues. A highly conductive silver structure remains after the reduction, even at low processing temperatures, because the low boiling points of non-silver constituents allow for a controlled and complete or nearly complete removal of the non-silver constituents. Silver acetate is advantageously selected as the silver salt due to the volatility of the conjugate acid of the acetate ligand, acetic acid. Additionally, silver acetate is a normally stable compound that is generally considered nonflammable or non-explosive. Use of silver acetate may enable creation of a stable, non-explosive silver precursor ink.

The short chain carboxylic acid may have a chain length of seven carbons or less and typically has a chain length of five carbons or less. Examples of short chain carboxylic acids include, but are not limited to, formic acid, acetic acid, propionic acid, butyric acid and pentanoic acid. Preferably, the short chain carboxylic acid has a chain length of two carbons or less. More preferably the short chain carboxylic acid is formic acid. Formic acid has been found to be particularly advantageous due to its low boiling point and volatile byproducts. Formic acid comprises an aldehyde functionality, which enhances its reducing ability. As the silver salt is reduced to elemental silver, formic acid in turn is oxidized to carbonic acid, which in turn forms carbon dioxide and water, both of which are volatile byproducts. As such, short chain carboxylic acids comprising an aldehyde functionality are preferred short chain carboxylic acids. Additionally, the use of formic acid may result in the formation of carbon dioxide and water, leaving no residual reducing agent.

The short chain carboxylic acid is a reducing agent for the silver salt, but due to the complexation with the complexing agent that occurs upon adding the short chain carboxylic acid to the mixture, the acid is substantially prevented from reducing the silver salt. Generally, reduction of the silver salt does not occur until the complexing agent is partially or completely evaporated from the ink formulation. The complexing agent may be evaporated after deposition of the ink formulation onto a desired substrate, at which time the acid reduces the silver salt to form a conductive silver coating or other silver structure on the substrate. Alternatively, the complexing agent may be partially evaporated from the ink during a further processing step in order to increase the viscosity of the ink and form a concentrated formulation for use in a printing technique such as direct ink writing. In this case, partial reduction of the silver salt occurs prior to deposition, such that the ink has a composite structure including a mixture of unreacted silver salt along with conductive silver particles (e.g., nanocrystals) formed during the partial reduction. The viscosity of such a composite ink may be tailored for printing techniques such as direct ink writing where the ink must span gaps during fabrication of three-dimensional structures. Evaporation of the complexing agent typically occurs at an elevated temperature below about 120° C., or between about 50° C. and 100° C., or between about 60° C. and 90° C. The evaporation may occur over a period of minutes or hours, depending on the volatility of the complexing agent and the temperature at which the evaporation is carried out. The complexing agent may also be evaporated at room temperature over a longer time period. In some aspects, the evaporation may be performed under reduced pressure. UV light may also be used to accelerate the reaction instead of heat, since UV light will reduce silver salts.

EXAMPLES

Reagents and solvents may be obtained from commercial sources such as Aldrich Chemical Co. (Milwaukee, Wis., USA) and Fisher Scientific (Pittsburgh, Pa., USA).

Example 1

In an illustrative experiment, silver acetate is dissolved in butylamine. This solution may be diluted with an alcohol, ester, water, or other solvent for processing. Typically, hydroxyethylcellulose (a cellulose derivative viscosifier) is added at a very small weight percentage to promote adhesion to the desired substrate. After thorough mixing, a small amount of formic acid is added to the mixture. After initial mass transfer of the acid to the mixture, the solution turns cloudy, possibly due to the initial formation of some small silver particles. The solution can then be centrifuged to form a substantially clear solution. The inventors have observed that water-based solutions remain clear for about 10 days, whereas ethanol-based solutions begin to appear cloudy within 24 to 48 hours.

The formic acid preferentially complexes with the butylamine since it is basic and does not immediately reduce the silver in solution. Since butylamine (boiling point about 78° C.) is typically used as the complexing agent, when the ink is exposed to open air it begins to evaporate. This allows the formic acid to begin reducing the silver. If ethanol is used as the solvent for the solution, 48-72 hours later the solutions are completely dried, leaving behind a silver film that is within one order of magnitude of the conductivity of bulk silver. If the solution is heated to 65° C., the conductivity is approximately equal to that of bulk silver within about 24 hours.

TABLE 1

Exemplary Silver-Based Ink Components

| Component | Exemplary Amount | Preferred Range |
|---|---|---|
| Alkyl amine (e.g., butyl amine) | 0.4 mL | 0.3-0.6 mL |
| Short chain carboxylic acid (e.g., formic acid) | 40 μL | 20-120 μL |
| Silver precursor (e.g., silver acetate) | 0.2 g | 0.1-0.3 g |
| Adhesion promoter (e.g., hydroxyethylcellulose) | 1.0 wt. % | 0.2-1.2 wt. % |
| Solvent (e.g., ethanol) | 1 mL | 0-5 mL |

TABLE 2

Exemplary Silver-Based Ink Components for E-Jet and Other Methods Requiring Higher Stability

| Component | Exemplary Amount | Preferred Range |
|---|---|---|
| Alkyl amine (e.g., ethylenediamine and amyl amine) | 0.4 mL (0.2 mL EDA + 0.2 mL amyl amine) | 0.3-0.6 mL |
| Short chain carboxylic acid (e.g., formic acid) | 40 μL | 20-120 μL |
| Silver precursor (e.g., silver acetate) | 0.2 g | 0.1-0.3 g |
| Adhesion promoter (e.g., hydroxyethylcellulose) | 0.2 wt. % | 0.2-1.2 wt. % |
| Solvent (e.g., water) | 1 mL | 0-5 mL |

Conductivity testing was carried out by drop-casting solutions onto glass slides and allowing evaporation to take place to facilitate reduction of the silver precursor to metallic silver, and then analyzing the electrical resistance of the silver structure using a four-point probe and profilometer. After 48 h at room temperature, a resistivity of $1.6 \times 10^{-5}$ Ωcm was measured for an exemplary silver structure, which is shown in FIG. 1. After 24 h at a temperature of 65° C., a resistivity of $1.6 \times 10^{-6}$ Ωcm was achieved for another exemplary silver structure, which is shown in FIG. 2.

Example 2

In another illustrative experiment, silver acetate ($CH_3COOAg$, ReagentPlus®, 99%) and formic acid (HCOOH, ACS Reagent, ≥88%) were purchased from Sigma-Aldrich (Milwaukee, Wis., USA), and ammonium hydroxide (Certified A.C.S. Plus, 29.3% assay) was purchased from Fisher Scientific (Pittsburgh, Pa., USA). All chemicals were used without further purification.

Reactive silver inks were synthesized by vortex mixing 1 g of silver acetate into 2.5 mL aqueous ammonium hydroxide at room temperature for 15 sec. Formic acid (0.2 mL) was then titrated into the solution dropwise for 60 sec, vortex mixing after each drop. The solution changed in color from light orange to brown to grayish black indicating the rapid reduction of silver ions to large silver particles. The solution remained undisturbed for 12 h to allow the large particles to settle out yielding a clear supernatant that was decanted and filtered through a 200 nm syringe filter (Whatman Filters, Anotop 25). This clear solution, which contains approximately 22 wt % silver, serves as the reactive silver ink. The sediment is composed of large silver flakes (>10 microns in size) corresponding to approximately 31% of the initial silver content used.

In a typical Tollens' reaction preparation, dilute silver nitrate and dilute sodium hydroxide precipitate a silver oxide intermediate that dissolves in an aqueous ammonia solution to create the Tollens' reagent (e.g., diamminesilver nitrate). The typical reactions proceed as follows:

$$2AgNO_3 + 2NaOH \xrightarrow{H_2O} Ag_2O + 2NaNO_3 + H_2O$$

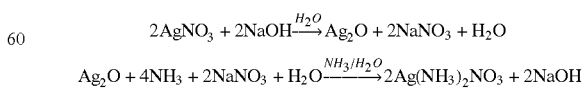

In contrast, the synthesis of the reactive silver inks, as described in reference to this illustrative experiment, is based on the following reactions to create a diamminesilver complex (e.g., diamminesilver acetate):

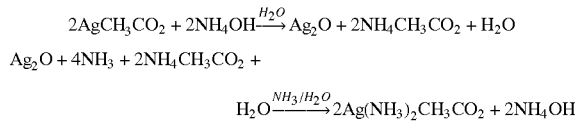

Excess ammonia (≥4:1 ratio) may be provided during the synthesis. The initial translucent red color that forms corresponds to silver oxide that has not been fully converted to the diamminesilver complex. Upon addition of formic acid, unprotected silver is reduced to form particles (approximately 31% by weight) that may be removed (e.g., by sedimentation). Approximately 40% by weight of the added formic acid is used in this process. The remaining formic acid neutralizes ammonium hydroxide by protonating the hydroxide to water and creating ammonium formate. The corresponding decrease in pH (e.g., from about 14 to about 10.6) enables more free ammonia to exist in solution, thereby creating the desired diamminesilver complex. Notably, the diamminesilver complex contains a high percentage of silver in solution compared to previously reported Tollens' reagent chemistries. By using excess ammonia in water, the diamminesilver(I) complex may be formed directly without the need for a silver oxide intermediate.

The reactive silver ink includes this final solution, which contains diamminesilver (I) cations, acetate anions, and formate anions. The reactive silver ink may be highly transparent. As the ink dries, the labile ammonia ligands evaporate allowing the silver cations to be reduced by the formate anions as well as acetic acid produced in solution from the uncomplexed silver that was previously reduced. The combination of formate and acetate ions with acetic acid results in a solution that reduces to silver and silver acetate particles upon drying at room temperature. The decomposition equations are as follows:

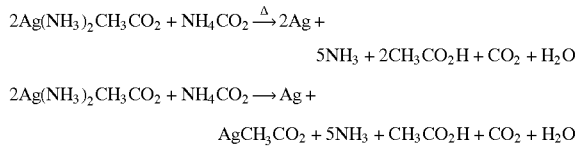

Upon annealing at 90° C., elemental silver may be the only phase that remains due to the rapid evaporation of ammonia ligands and low boiling point reactants. When stored in a sealed vial, the solution may be stable for months under ambient conditions without further precipitation. For example, in a sealed glass vial, the ink is stable at room temperature for 4-6 months. However, its stability can be extended beyond 6 months, if the ink is stored in an opaque vial and refrigerated. Upon ink patterning and evaporation silver particles may rapidly form.

The UV/Vis absorption spectrum of the reactive silver ink was obtained using a CARY 500 Scan UV-vis-NIR spectrophotometer (Varian, Inc.) with a standard 1 cm liquid cuvette, with a background calibration run using deionized water. As shown in FIG. 3, the UV/Vis absorption spectrum shows a lack of absorption in the 400-425 nm range typically associated with the presence of silver particles, thus confirming that the ink is particle-free.

Thermogravimetric analysis (TGA) was performed using a Q50 (TA Instruments, New Castle, Del.). An air environment was simulated by co-flowing 79% nitrogen and 21% oxygen at a volume rate of 100 mL min$^{-1}$. One sample was held at 23° C. for 48 h, and the other sample was ramped at 10° C. min$^{-1}$ to 90° C. and held at this temperature for 30 min. Each sample included 40 μL of ink placed in a 90 μL alumina cup. As shown in FIG. 4, TGA indicates that the ink contains a solids loading of approximately 26 wt % when dried at 23° C. and a final silver content of approximately 22 wt % after annealing at 90° C. for 15 min.

Figure 5:
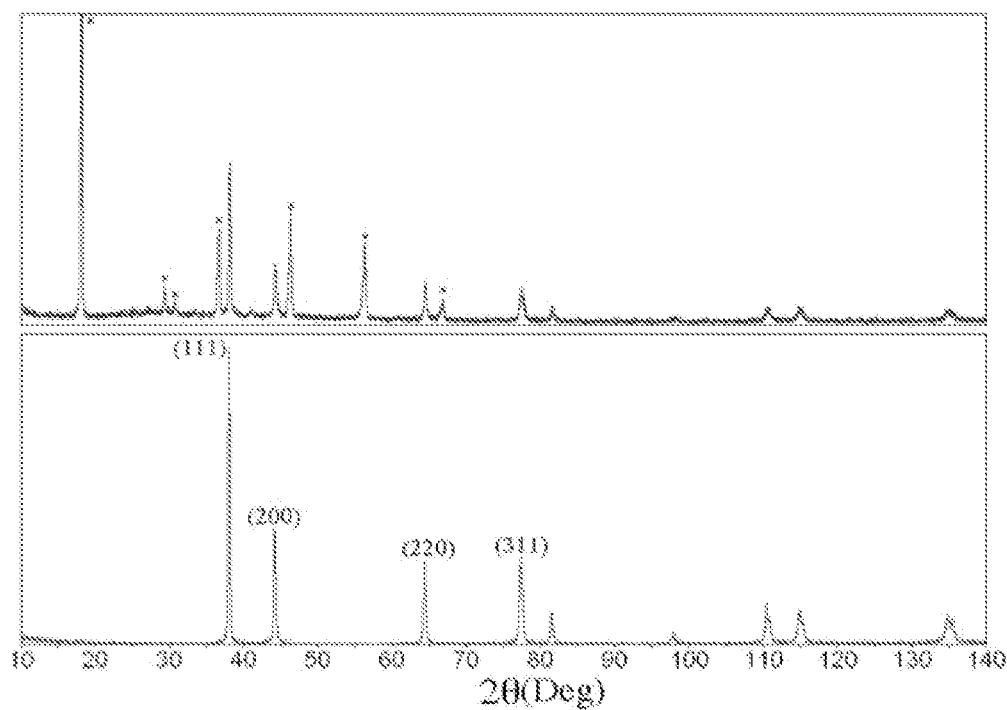
FIG. 5 shows X-ray diffraction data for films patterned from one exemplary reactive silver ink.

X-ray diffraction (XRD) was performed using a Siemens Bruker D5000 (Bruker, Inc., Madison, Wis.) with Cu K$_\alpha$ radiation and 2θ values from 10-140°. Low background holders were custom machined from an acrylic rod. Samples were prepared by allowing 2 mL of reactive silver ink to either evaporate at 23° C. for 24 h or anneal at 90° C. for 15 min. The maximum silver content may be limited by the diamminesilver (I) cation solubility in water. Under ambient conditions, residual acetate groups may be present, which may be removed upon heating to 90° C. As shown in FIG. 5, XRD reveals the presence of both silver and silver acetate (denoted by asterisks) peaks in drop-cast films produced from this ink and dried at 23° C. for 24 h (top of figure), while only silver peaks are observed when these films are heated to 90° C. for 15 min (bottom of figure). Based on these data, it is estimated that the dried ink is composed of approximately 57 wt % silver and approximately 43 wt % silver acetate. Note, diamminesilver(I) complexes may exist only in solution, reverting back to their constituent salts upon drying when the complex is not reduced to metallic silver.

Figure 6:
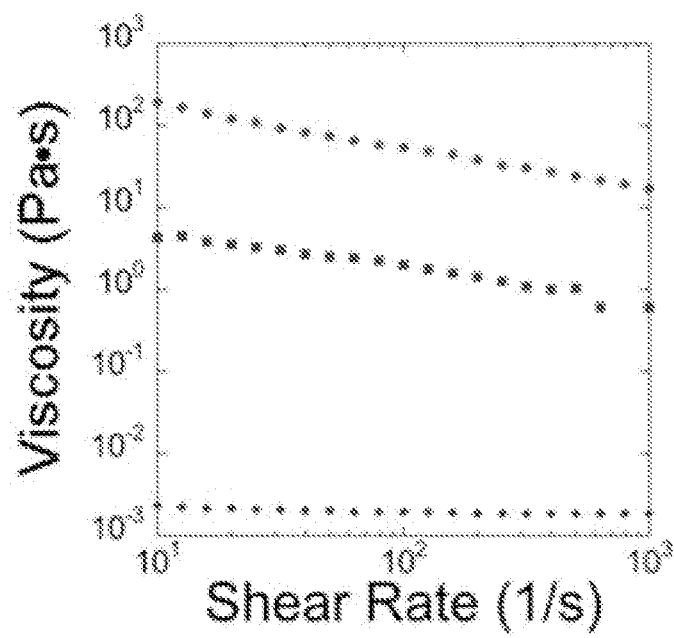
FIG. 6 shows viscosity data as a function of shear rate for one exemplary reactive silver ink.
Figure 7:
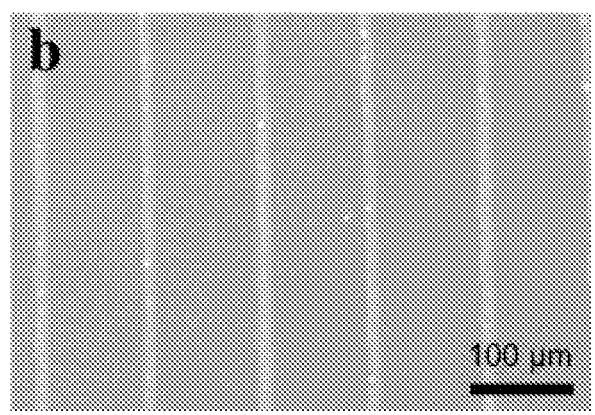
FIG. 7 shows exemplary conductive silver patterns formed on a substrate (silicon) by direct-writing of silver-based inks.

Reactive silver ink viscosity was acquired using a stress-controlled rheometer (AR-G2, TA Instruments, New Castle, Del.). Measurements were performed with a small double gap geometry using 5 mL of solution. All measurements were performed at 23° C. using a solvent trap to prevent evaporation. The ink viscosity (η) was acquired as a function of shear rate (10-1000 s$^{-1}$) in a logarithmically ascending series. FIG. 6 shows the viscosity of the reactive silver ink (diamonds), a silver particle ink developed for pen-on-paper printing (squares), and a silver nanoparticle ink developed for omnidirectional (3D) printing (circles) as a function of shear rate. As shown in FIG. 6, the ink possesses a low initial viscosity of 2 mPa·s, which may enable its flow through ultrafine nozzles. However, the ink undergoes significant wetting and spreading on the substrate resulting in minimum feature widths (~5 μm) that are considerably larger than the nozzle size, as shown in FIG. 7. By comparison, silver particle inks developed for omnidirectional printing and pen-on-paper writing may have apparent viscosities roughly 3-5 orders of magnitude higher at low shear, as shown in FIG. 6. Due to the presence of silver particles, those silver particle inks cannot be printed through nozzles that are less than approximately 30 μm without intermittent clogging. In other examples, the reactive silver ink may have a viscosity between about 1 mPa·s and about 10$^6$ mPa·s under low shear conditions.

Figure 8:
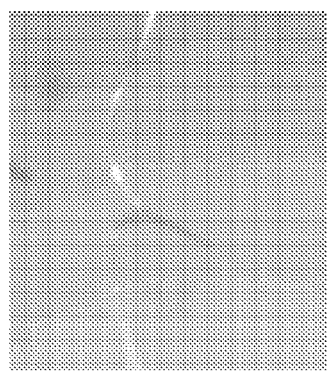
FIG. 8 shows an exemplary glass nozzle bending as it is driven into contact with a silicon substrate.

Direct ink writing was carried out using a 3-axis micropositioning stage (ABL 900010, Aerotech, Inc., Pittsburgh, Pa.), whose motion was controlled by computer-aided design software (A3200, Aerotech, Inc., Pittsburgh, Pa.) The reactive silver ink was housed in a syringe (3 mL barrel, EFD, Inc., East Providence, R.I.) attached by luer-lok to a borosilicate nozzle (100 nm tip diameter, World Precision Instruments, Inc., Sarasota, Fla.) that had been coated in a fluoropolymer (PFC504A-FS, Cytonix, LLC, Beltville, Md.) to prevent wicking of the silver ink on the outside of the nozzle. An air-powered fluid dispenser (Ultimus V, EFD, Inc.) was used to pressurize the barrel and control the ink flow rate. Typically, a pressure of 50 psi was cycled on and off to fill the ultrafine nozzle with ink. The nozzle was then brought into contact with the substrate. The pressure was removed and patterning was achieved simply by moving the nozzle across the substrate surface at speeds ranging from 1-5 mm/s at 22-25° C. The printed features may have varying widths depending on the degree of contact between the nozzle and the substrate. At this size (e.g., the 100 nm diameter tip), the glass nozzles are highly flexible and can be brought into contact with the substrate and bent to nearly 90° without breaking as shown in FIG. 8. The printed electrodes are about 5-10 µm in width and about 0.6 µm in height.

Figure 9:
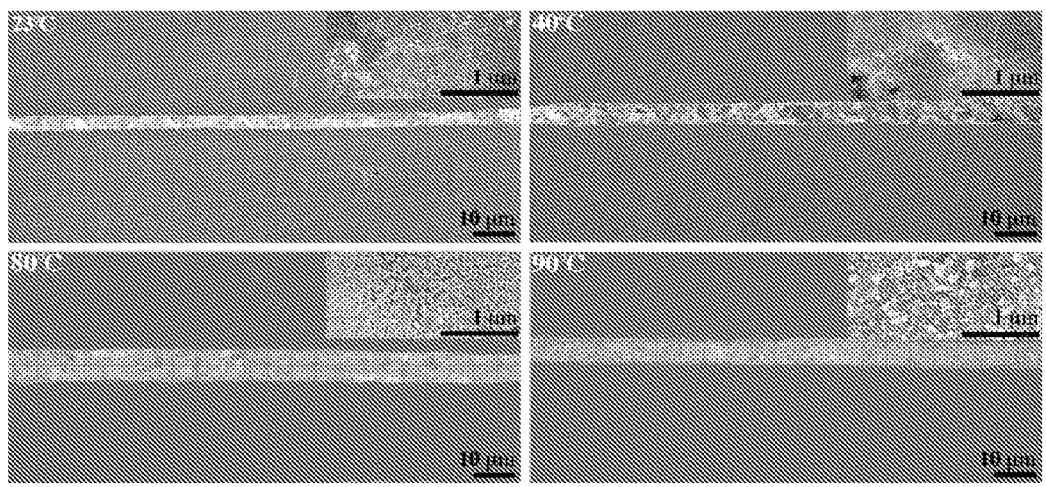
FIG. 9 shows scanning electron microscopy images of exemplary conductive silver patterns formed by direct ink writing of silver-based inks.

Scanning electron microscopy (SEM) was used to image the surface of silver electrodes printed on silicon wafers using direct ink writing. The SEM images were acquired using a field emission microscope (Hitachi S4800). FIG. 9 shows SEM images of the top surfaces of printed silver electrodes that have been dried at 23° C. and annealed at 90° C. for 15 min, respectively. Unlike drop-cast films that may require drying times of ~24 h, the printed features may dry nearly instantaneously yielding fine particles at 23° C. and after annealing at 90° C. FIG. 9 shows significant variations in the printed line widths (~5-10 microns), which arise largely from the poor control over ink wetting and spreading. The higher magnification SEM images (insets) show the presence of fine particles that form during evaporation and subsequent annealing of the printed electrodes.

The surface roughness of the printed silver electrodes produced from direct writing of the reactive silver ink was measured using atomic force microscopy (AFM). These measurements were performed using an Asylum Research MFP-3D in tapping mode at 0.5 Hz at a 256-line resolution with Tap300Al-G silicon tips purchased from Budget Sensors. The root-mean-square roughness of the printed electrodes dried at 23° C. was 92±12 nm. This value decreased upon annealing to 84±8 nm, 61±7 nm, and 50±5 nm at 40° C., 80° C. and 90° C. for 15 min, respectively.

Figure 10:
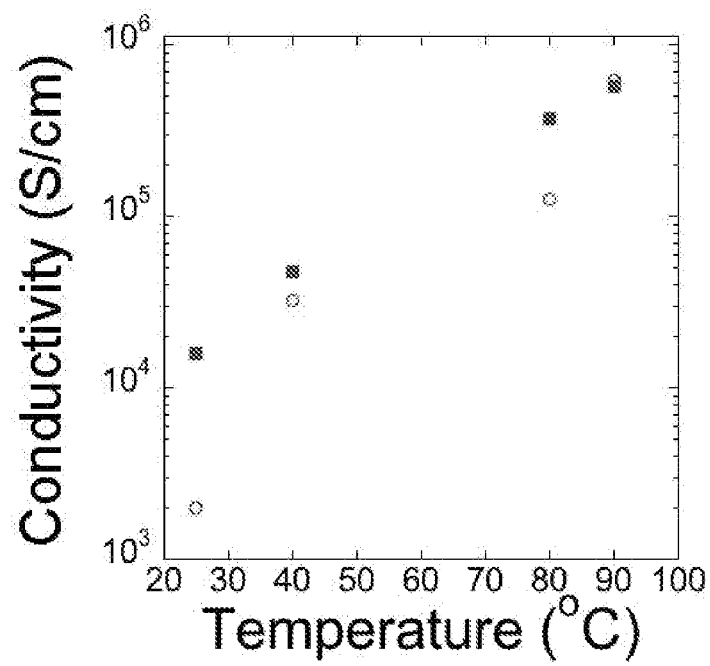
FIG. 10 shows electrical conductivity data as a function of temperature for one exemplary conductive silver pattern formed by printing of silver-based inks and drop-cast films.
Figure 11:
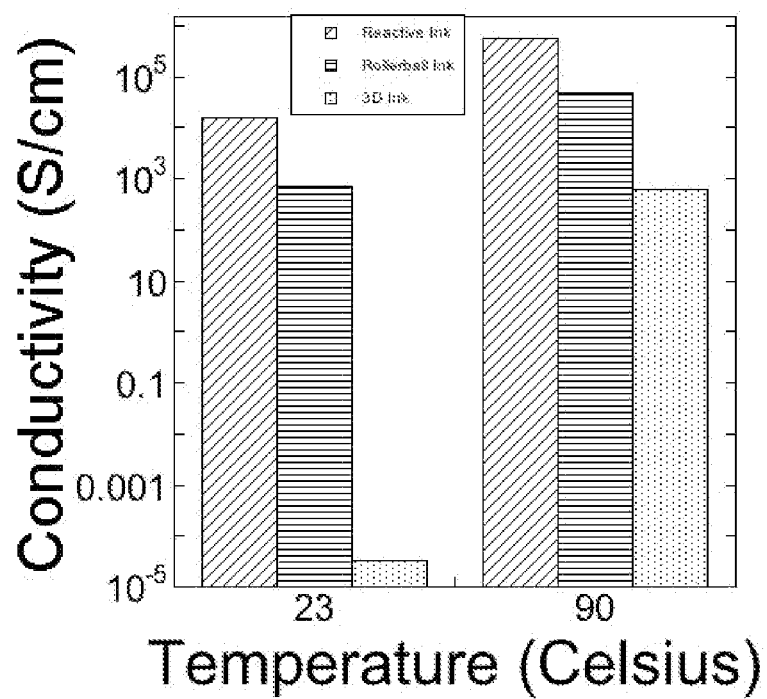
FIG. 11 shows electrical conductivity data as a function of temperature for one exemplary silver ink, a silver particle ink developed for pen-on-paper printing, and a silver nanoparticle ink developed for omnidirectional printing.

The electrical resistance of the printed electrodes produced by direct writing of the reactive silver ink was measured using a two-point probe method (Keithley 2400 with a voltage/current sweep). For comparison, the electrical resistance of drop-cast films was also measured using a RM3-AR four-point probe coupled to a multiheight probe with a cylindrical probe head (Jandel Engineering Ltd., Linslade, UK). The films were prepared by casting 0.4 mL drops of the reactive silver ink onto glass slides. The printed electrode height was measured by AFM, while the film height was measured using a Dektak 3030 (Veeco, Inc.) contact profilometer. Their electrical conductivity is determined by taking the inverse of the sheet resistance in $\Omega \square^{-1}$ multiplied by height (cm). Note, the contact resistance between the tungsten probes (Signatone) was measured and subtracted from these data. The electrical conductivity of the printed silver electrodes and films dried at 23° C. and annealed at varying temperatures is shown in FIGS. 10-11. In FIG. 10, the conductivity of the printed electrodes is shown by the closed squares, and the conductivity of the drop-cast films is shown by open circles. For comparison, data is also provided in FIG. 11 for electrodes produced from silver particle inks developed for omnidirectional printing and pen-on-paper writing. Upon drying at 23° C., the electrical conductivity of electrodes printed from the reactive silver ink exceeds $10^4$ S/cm, which is eight orders of magnitude higher than electrodes produced from silver nanoparticle inks formulated for omnidirectional printing, which contain a polymer capping agent and a humectant to enable in- and out-of-plane printing of self-supporting filaments. Moreover, the conductivity of the electrodes produced from the reactive silver ink is an order of magnitude greater than that observed for the silver particle ink developed for pen-on-paper writing. Upon annealing the electrodes printed from this reactive silver ink at 90° C. for 15 min, their electrical conductivity is approximately identical to that of bulk silver ($6.25 \times 10^5$ S/cm), while those produced from either of the silver particle inks exhibit at least an order of magnitude lower conductivity despite their substantially higher initial silver content of 75 wt % and 55 wt %, respectively. An annealing temperature of 90° C. is preferable to achieve an electrical conductivity equivalent to that of bulk silver.

Figure 12:
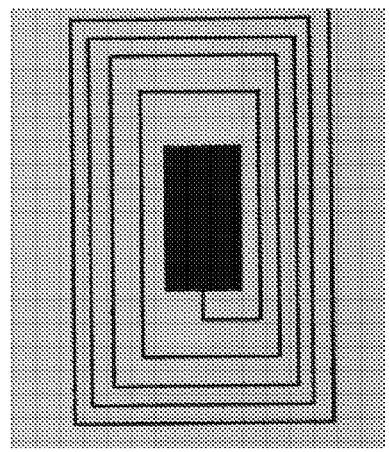
FIG. 12 shows an exemplary silver pattern formed on a glass substrate by inkjet printing.

Inkjet printing was performed using a Fuji Dimatix DMP 2800 printer with 1 pL cartridges. The reactive silver ink was modified by adding 10% by volume of 2,3 butanediol, which serves as both a humectant and viscosifying aid. Ink droplets were produced using an ejection frequency of 2 kHz at 30° C. and the ink droplets were dispensed with a spacing of 15 µm. A custom ejection waveform was generated in order to suppress satellite droplet formation and ensure reliable printing of the ink. FIG. 12 shows a test pattern composed of printed features with minimum widths of 80-100 µm deposited on a glass slide.

Figure 13:
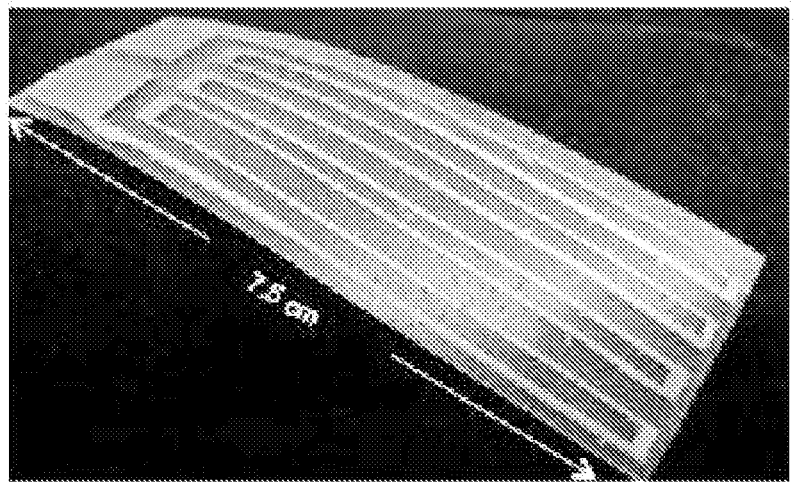
FIGS. 13 and 14 show exemplary conductive silver patterns formed on flexible substrates (ethylene vinylacetate) by air brushing of silver-based inks.
Figure 14:
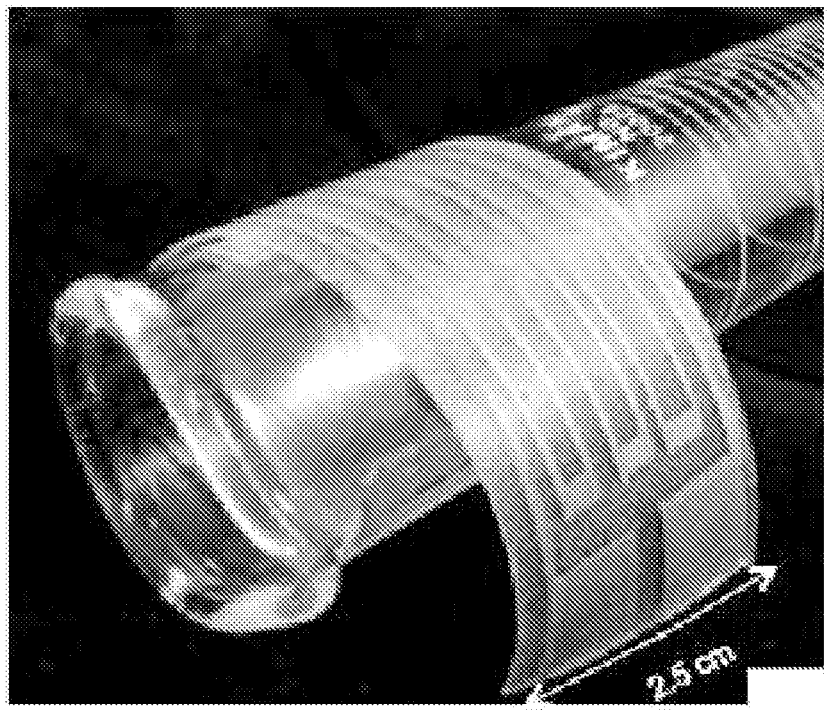

The reactive silver ink also was deposited onto an ethylene vinyl acetate substrate (75 mm×25 mm) using an Aztec A7778 double-action airbrush. The ink was gravity fed into the airbrush via a 10 mL cup and then dispensed by applying a pressure of 25 psi using an Aztec AC200 air compressor fitted with a moisture trap. FIGS. 13-14 show a representative pattern produced by spraying the ink through a laser-cut stencil.

The adhesion of the reactive silver ink to several substrates, including glass, cellulose acetate, cellophane, polyimide, and PET films were assessed. The substrates were pre-cleaned with isopropanol, acetone, or deionized water. Scotch tape was used to test adhesion by applying half of the tape to the bare substrate and half to regions patterned with the ink. After removing the tape, the samples were inspected to visually to determine the amount of silver removed from the substrate. The reactive silver ink may adhere very well to poly(ethylene terephthalate) and polyimide substrates. The reactive silver ink also may adhere well to other substrates such as glass and cellulose-based materials. All plastic films were also flexed and bent with no observed decrease in adhesion of the silver features.

Example 3

In another illustrative experiment, 0.5 g silver acetate is dissolved in 1.4 mL amylamine. This solution is diluted with 1 mL water and 125 µL propylene glycol. After thorough mixing, 90 µL formic acid is added to the mixture to form an ink composition. The ink composition has a translucent yellow appearance, which may be distinguishable from a clear, colorless appearance of an ink composition utilizing ammonia as the primary complexing agent.

This ink composition may be useful for inkjet printing and/or spin coating. When heated to 100° C. for 2 minutes, the ink composition may produce a silver structure having a conductivity of greater than about 50% of the conductivity of bulk silver.

The mixture may be placed at a temperature near −20° C. prior to addition of the formic acid. This may enable a yield of the solution of greater than or equal to about 90%, preferably greater than or equal to about 99% to be achieved. The yield of the solution may represent the amount of silver by weight that remains in solution, instead of being precipitated out, upon addition of the formic acid.

The stability of the ink composition may depend on utilizing water as a co-solvent. If a non-aqueous solvent (e.g., ethanol) is used, a diamine (e.g., ethylenediamine) may be added to achieve solution stability. A conductivity of greater than about 90% of the conductivity of bulk silver at a temperature of less than about 100° C. may be achieved using non-aqueous solvents.

Example 4

In another illustrative experiment, 0.5 g silver acetate is dissolved in 1.2 mL butylamine. This solution is diluted with 0.8 mL water and 250 µL butanol. After thorough mixing, 90 µL formic acid is added to the mixture to form an ink composition. The ink composition has a translucent yellow appearance, which may be distinguishable from a clear, colorless appearance of an ink composition utilizing ammonia as the primary complexing agent.

This ink composition may be useful for airbrush printing. The ink composition may dry relatively quickly. When heated to 100° C. for 2 minutes, the ink composition may produce a silver structure having a conductivity of greater than about 50% of the conductivity of bulk silver.

The mixture may be placed at a temperature near −20° C. prior to addition of the formic acid. This may enable a yield of the solution of greater than or equal to about 90%, preferably greater than or equal to about 99% to be achieved.

The stability of the ink composition may depend on utilizing water as a co-solvent. If a non-aqueous solvent (e.g., ethanol) is used, a diamine (e.g., ethylenediamine) may be added to achieve solution stability. A conductivity of greater than about 90% of the conductivity of bulk silver at a temperatures of less than about 100° C. may be achieved using non-aqueous solvents.

Figure 15:
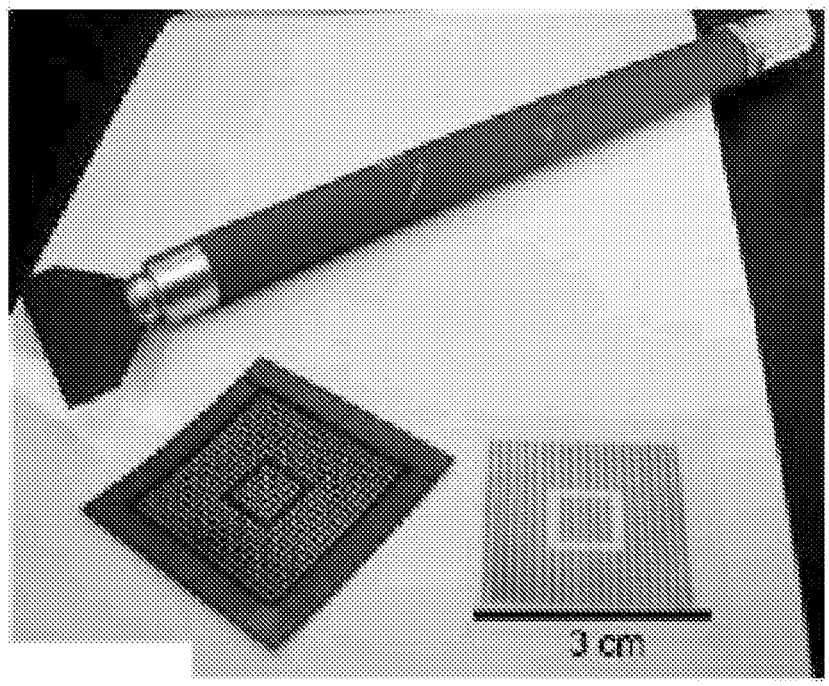
FIG. 15 shows an exemplary conductive silver pattern formed on a flexible substrate (polyethyleneterephthalate) by screen/squeegee printing of silver-based inks.
Figure 16:
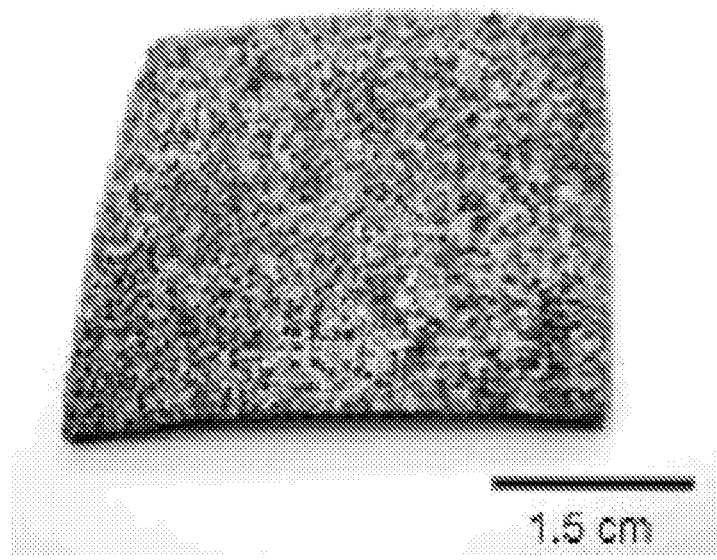
FIG. 16 shows an exemplary conductive silver coating formed on a porous substrate (foam) by dip coating of silver-based inks.
Figure 17:
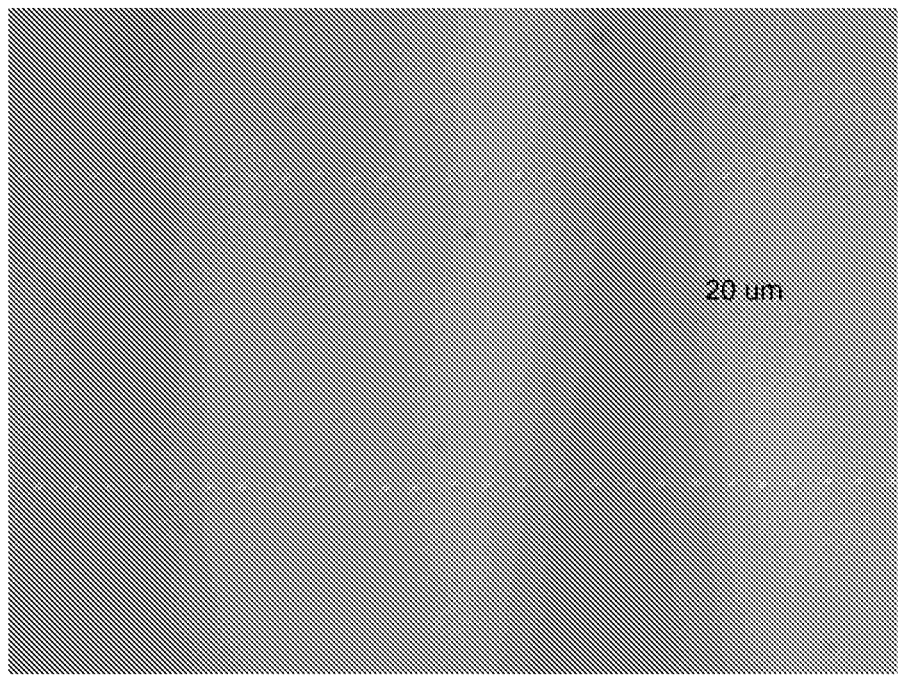
FIG. 17 shows an exemplary silver pattern formed on a silicon substrate by E-jet printing.
Figure 18:
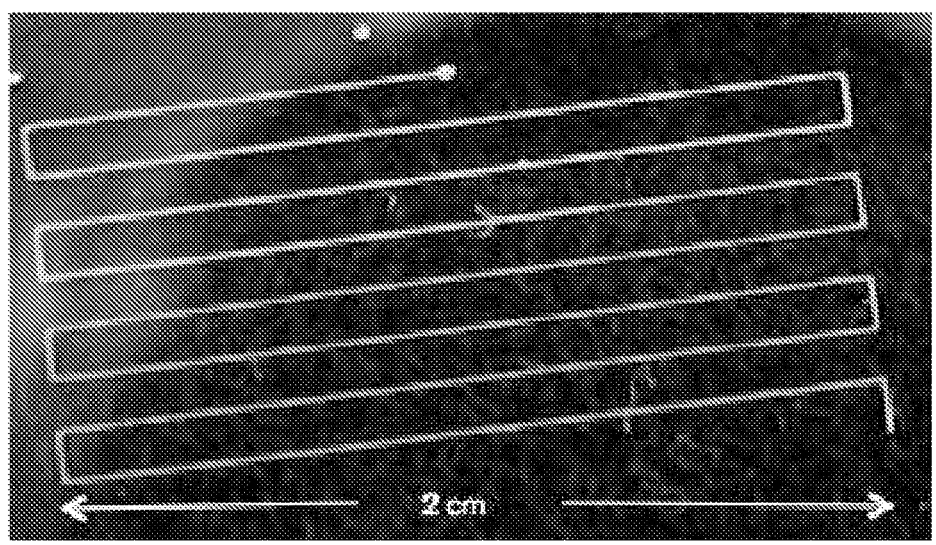
FIG. 18 shows exemplary conductive silver microelectrodes formed on a glass substrate by filamentary extrusion-based printing (direct ink writing)
Figure 19:
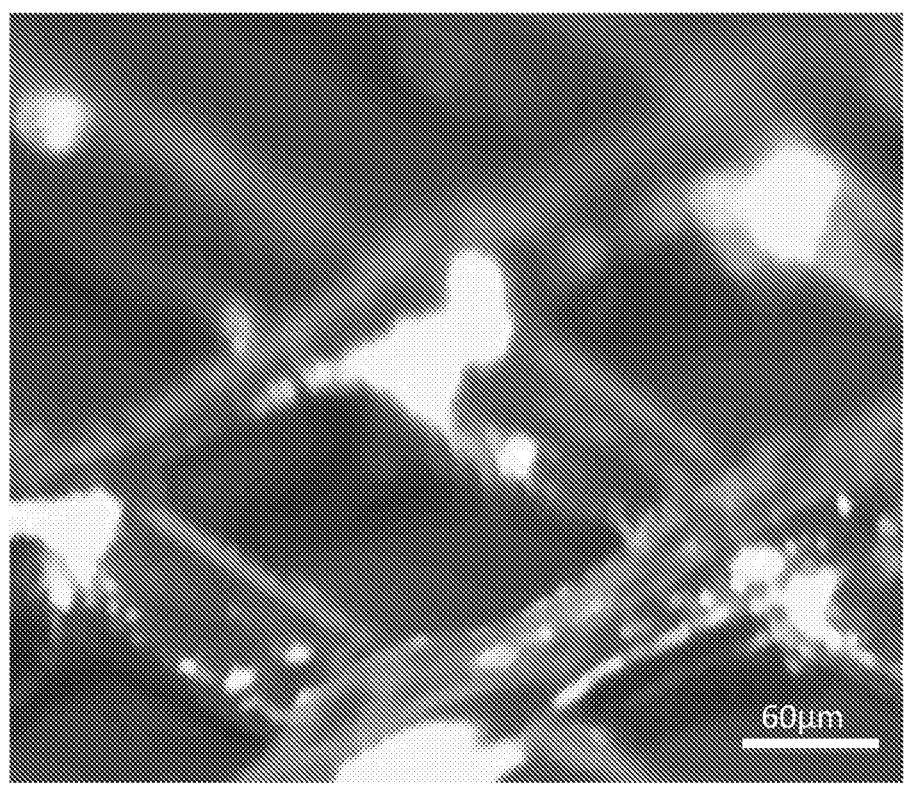
FIG. 19 shows an exemplary conductive silver lattice produced on a glass substrate by filamentary extrusion-based printing (direct ink writing).

In any of the embodiments described herein, the ink can be dissolved in ethanol to create a spray processable ink or an inkjet ink. Deposition has been carried out using an airbrush over a stencil to produce a conductive silver pattern on a flexible substrate as shown in FIGS. 13-14. Generally speaking, the ink may be patterned directly on flexible, temperature sensitive substrates and retain conductivity after bending and stretching. FIGS. 15 and 16 show conductive silver patterns or coatings prepared by screen/squeegee printing and dip-coating over polyurethane, respectively, and the technology is also applicable to inkjet, e-jet, and roll-to-roll methods using, for example, Meyer rods. Meyers rods are used to demonstrate roll-to-roll printing by spreading the ink over a large area in a short time by the ink's surface energy and viscosity, allowing the rod to create a large, smooth pattern. An example of E-jet or electrohydrodynamic printing is shown in FIG. 17. E-jet printing utilizes an electric potential between two objects. Where one of the objects is a substrate, and the other is a needle that is filled with ink. The charge differential causes the ink to be attracted to the substrate and break up into small drops due to Rayleigh instabilities and create very fine features that are a result of the nozzle size used and the surface energy and polarity of the ink.

In addition, the viscosity of the ink may be increased by evaporation and the addition of hydroxyethylcellulose in order to engineer an ink for a viscoelastic patterning technique such as direct ink writing. Conductive silver patterns were fabricated with a 10 micron tip at a rate of 4 mm/s and exhibited good adhesion to the underlying substrate and conductivity retention. The ink may have a low shear viscosity of between about 1 Pa·s and about $10^6$ Pa·s. Under shear conditions, the viscoelastic inks can exhibit reduced viscosity levels of, for example, about 50 mPa·s.

Figure 20:
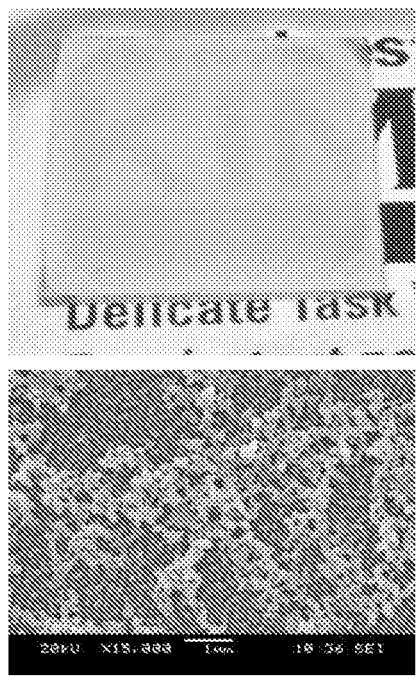
FIGS. 20-27 show exemplary conductive films formed on a glass substrate by spin coating.
Figure 21:
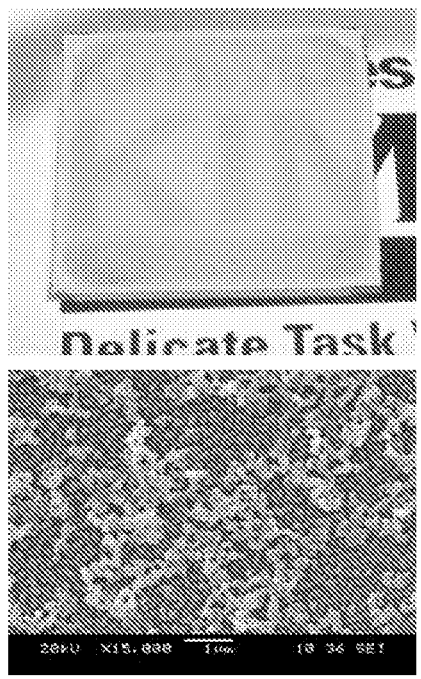
Figure 22:
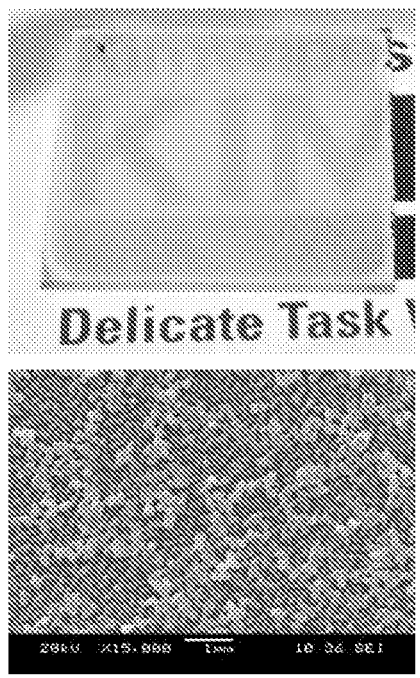
Figure 23:
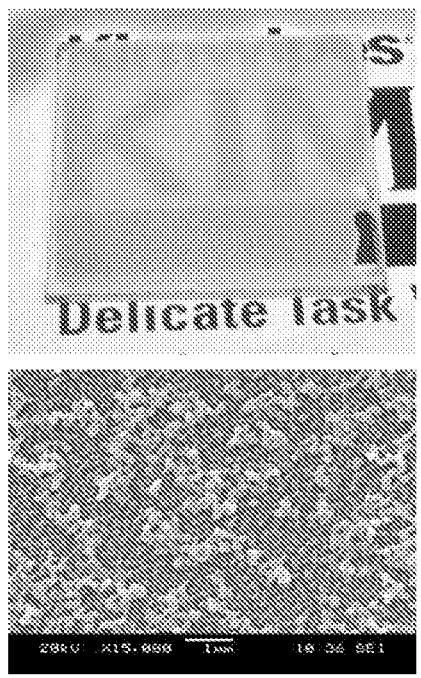

In any of the embodiments described herein, the ink can be applied to a substrate by spin coating. For example, FIGS. 20-23 show conductive films with varying transparency and resistance. A 6.7 weight percent ink is spin coated for 60 s onto a glass substrate, followed by annealing at 120° C. for 5 minutes to prepare each of the films shown in FIGS. 20-23. The resistance of the film is measured by a multimeter at 1 cm length. In each of FIGS. 20-23, the top portion of the figure shows a photographic image of the coated substrate, and the bottom portion of the figure shows a SEM image of particles percolating through the film. The particle size is about 20 nm to about 200 nm, and the films include localized 1-3 layers of particles with a thickness of about 500 nm. As shown in the SEM images, the first layer is not substantially continuous, and the second layer contributes primarily to the particle percolation. The film shown in FIG. 20 is spin coated at 1000 rpm and exhibits a resistance of 18 Ω; the film shown in FIG. 21 is spin coated at 1500 rpm and exhibits a resistance of 25 Ω; the film shown in FIG. 22 is spin coated at 2000 rpm and exhibits a resistance of 290 Ω; and the film shown in FIG. 23 is spin coated at 2500 rpm and exhibits a resistance of 1500 Ω.

Figure 24:
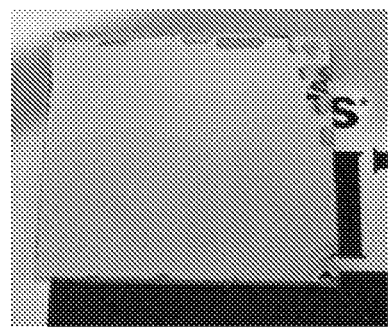
Figure 25:
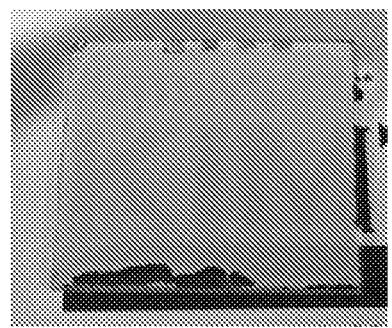
Figure 26:
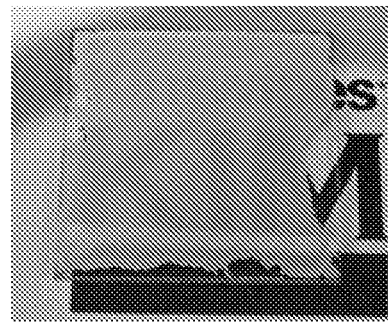
Figure 27:
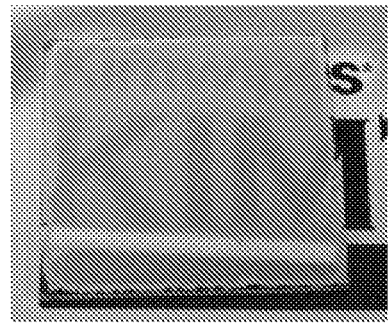

FIGS. 24-27 show conductive films produced by spin coating at varying spin speeds. An 11 weight percent ink is spin coated for 60 s onto a glass substrate, followed by annealing at 120° C. for 5 minutes to prepare each of the films shown in FIGS. 24-27. The resistance of the film is measured by a multimeter at 1 cm length. The film thickness is about 500 nm. The film shown in FIG. 24 is spin coated at 1000 rpm and exhibits a resistance of 6 Ω; the film shown in FIG. 25 is spin coated at 2000 rpm and exhibits a resistance of 10 Ω; the film shown in FIG. 26 is spin coated at 3000 rpm and exhibits a resistance of 13 Ω; and the film shown in FIG. 27 is spin coated at 3000 rpm and exhibits a resistance of 23 Ω. As shown in FIGS. 24-27, the films become increasingly transparent with increasing spin speeds over about 2000 rpm.

Figure 28:
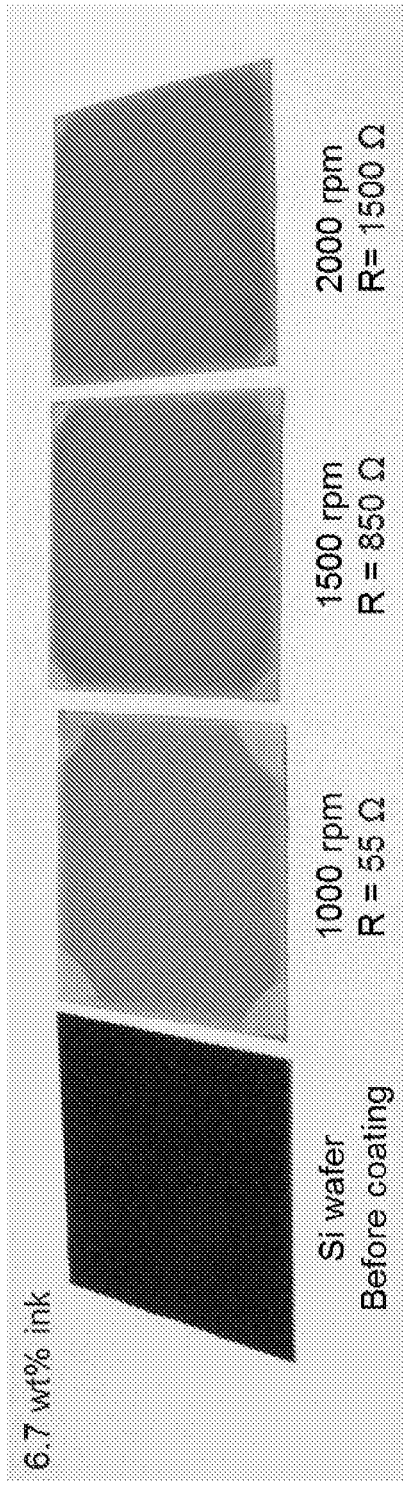
FIGS. 28-29 show exemplary conductive films formed on a silicon substrate by spin coating.
Figure 29:
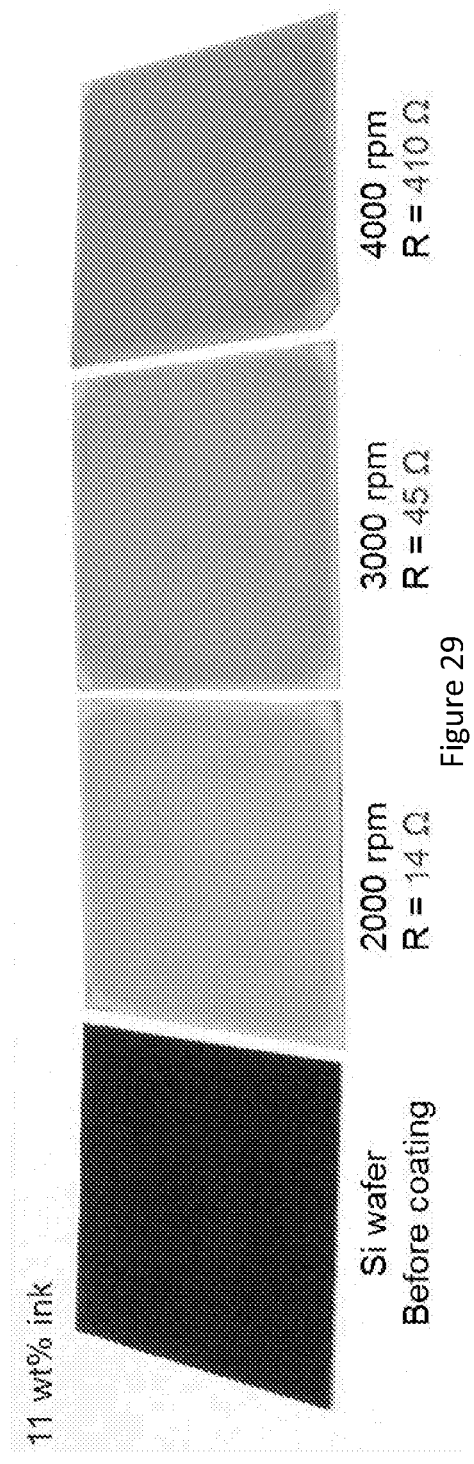

FIGS. 28-29 show conductive films produced by spin coating at varying spin speeds. An ink is spin coated for 60 s onto a textured silicon wafer substrate, followed by annealing at 120° C. for 5 minutes to prepare each of the films shown in FIGS. 28-29. A 6.7 weight percent ink is used to produce the films shown in FIG. 28, and an 11 weight percent ink is used to produce the films shown in FIG. 29. The resistance of the film is measured by a multimeter at 1 cm length. FIG. 28 shows, from left to right, a silicon wafer before coating, a silicon wafer spin coated at 1000 rpm and exhibiting a resistance of 55 Ω, a silicon wafer spin coated at 1500 rpm and exhibiting a resistance of 850 Ω, and a silicon wafer spin coated at 2000 rpm and exhibiting a resistance of 1500 Ω. FIG. 29 shows, from left to right, a silicon wafer before coating, a silicon wafer spin coated at 2000 rpm and exhibiting a resistance of 14 Ω, a silicon wafer spin coated at 3000 rpm and exhibiting a resistance of 45 Ω, and a silicon wafer spin coated at 4000 rpm and exhibiting a resistance of 410 Ω.

Figure 30:
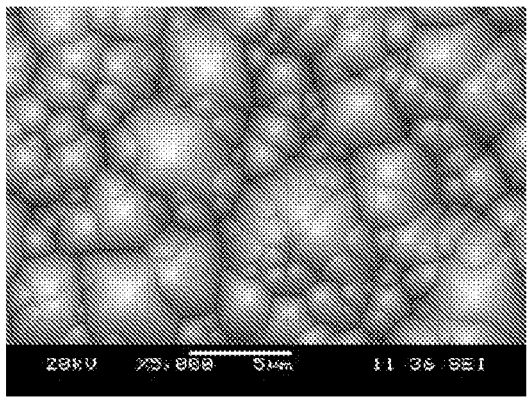
FIGS. 30-34 show exemplary conformal coating of a textured silicon substrate by spin coating.
Figure 31:
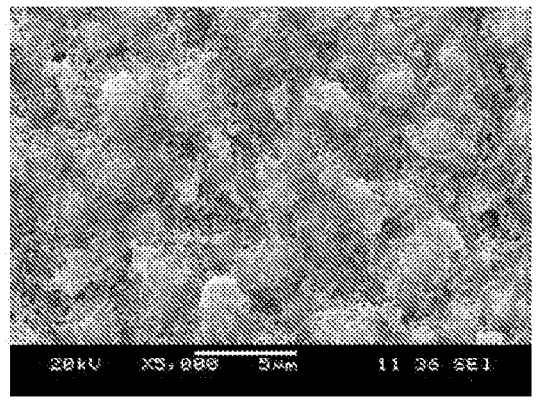
Figure 32:
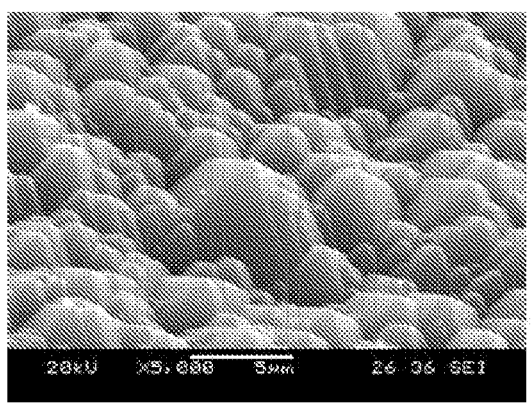
Figure 33:
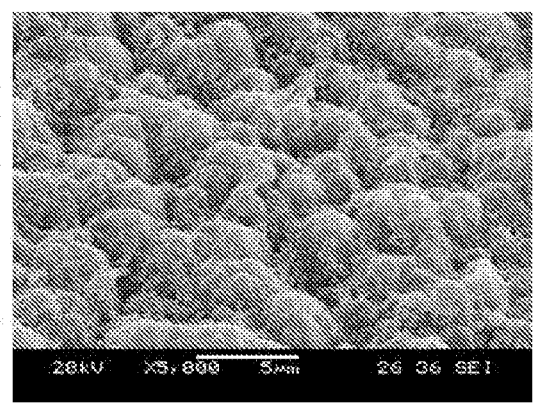
Figure 34:
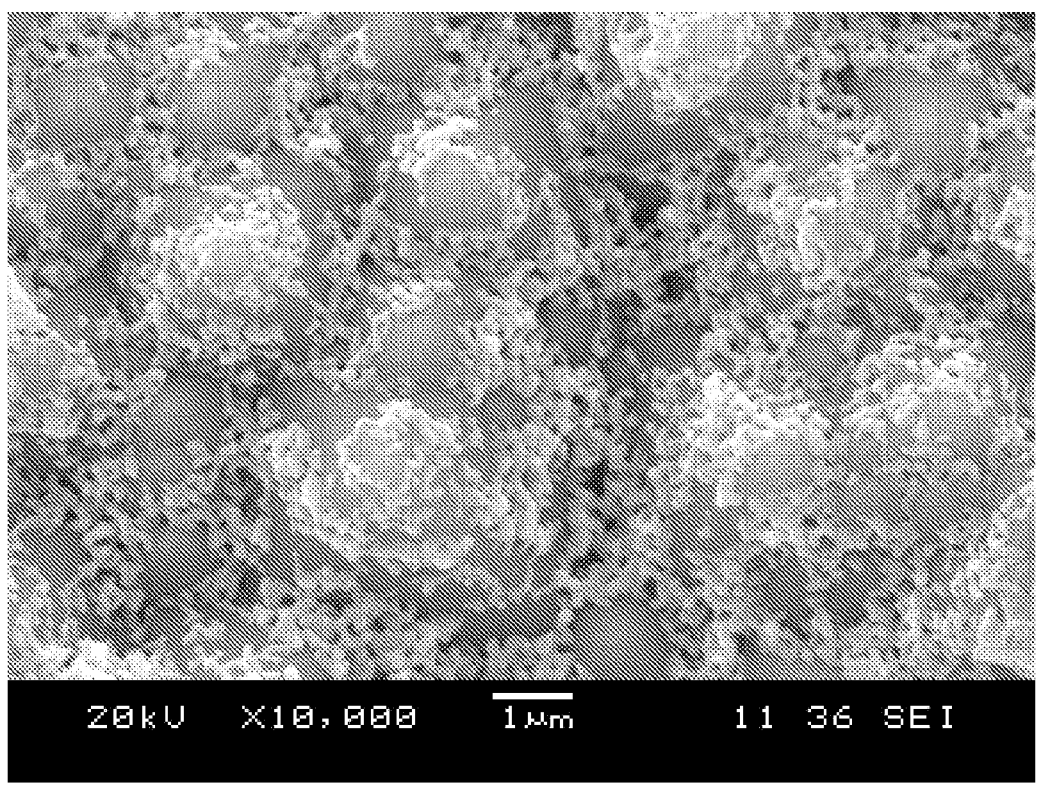

FIGS. 30-34 illustrate conformal coating on a textured silicon wafer. FIGS. 30 and 32 show a top view and a 45° tilt view, respectively, of the surface of a textured silicon wafer before coating. An 11 weight percent ink is spin coated at 3000 rpm for 60 s onto the textured silicon substrate, followed by annealing at 120° C. for 5 minutes to form a film on the surface of the textured silicon wafer. FIGS. 31 and 34 show top views of the coated surface of the textured silicon wafer. FIG. 33 shows a 45° tilt view of the coated surface of the textured silicon wafer. The resistance of the film is measured by a multimeter at 1 cm length. The film exhibits a resistance of 45 Ω.

Since the ink has such a low processing temperature, nearly any substrate is accessible and structures with extremely high conductivity can be formed. The conductive structures may be metallic lines, dots, coatings, patterns, lattices or other three-dimensional structures. Furthermore, the ink can be modified easily using the aforementioned reduction mechanism and be made into inks that are compatible with nearly any processing technique. Also, unlike previous inks that require long and tedious particle synthesis and processing regimes, these inks can be synthesized literally in a matter of minutes with minimal difficulty.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. An ink composition for making a conductive silver structure, the ink composition comprising:
   a silver salt; and
   a complex of (a) a complexing agent and a short chain carboxylic acid, or (b) a complexing agent and a salt of a short chain carboxylic acid.

2. The ink composition of claim 1, wherein the short chain carboxylic acid is selected from the group consisting of formic acid, acetic acid, propionic acid, pentanoic acid, and butyric acid.

3. The ink composition of claim 2, wherein the short chain carboxylic acid is formic acid.

4. The ink composition of claim 1, wherein the complexing agent is selected from the group consisting of an alkyl amine and ammonia.

5. The ink composition of claim 4, wherein the alkyl amine is selected from the group consisting of methylamine, ethylamine, propylamine, butylamine, and amylamine.

6. The ink composition of claim 1, wherein the silver salt is selected from the group consisting of silver acetate, silver formate, silver carbonate, silver fluoride, silver nitrate, silver nitrite, silver chloride, silver bromide, silver iodide, silver phosphate, and silver oxide.

7. The ink composition of claim 1, further comprising methylenediamine or ethylenediamine.

8. The ink composition of claim 1, further comprising a solvent selected from the group consisting of ethanol, butanol, propylene glycol, water, and combinations thereof.

9. The ink composition of claim 1, wherein the ink composition has a viscosity of between about 1 mPa·s and about $10^6$ mPa·s at 23° C. under low shear conditions.

10. The ink composition of claim 1, wherein the silver salt is silver acetate,
   wherein the complexing agent is selected from the group consisting of methylamine, ethylamine, propylamine, butylamine, amylamine, and ammonia, and
   wherein the short chain carboxylic acid is formic acid.

11. The ink composition of claim 10, further comprising ethylenediamine.

12. The ink composition of claim 10, further comprising a solvent selected from the group consisting of ethanol, butanol, propylene glycol, water, and combinations thereof.

13. The ink composition of claim 1, wherein the ink composition comprises water and an alcohol.

14. The ink composition of claim 1, wherein the complexing agent comprises a short chain diamine, and at least one of an alkyl amine and ammonia.

15. The ink composition of claim 14, wherein the short chain diamine comprises at least one of methylenediamine and/or ethylenediamine.

16. The ink composition of claim 1, wherein the complexing agent comprises an alkyl amine and a short chain diamine, and wherein the ratio of the alkyl amine to the short chain diamine is in a range from about 4:1 to about 1:4 on a volume:volume basis.

17. The ink composition of claim 1, wherein each of the complexing agent and the short chain carboxylic acid has a boiling point of about 120° C. or less.

18. The ink composition of claim 10, wherein the complexing agent further comprises a short chain diamine.

19. The ink composition of claim 18, wherein the short chain diamine comprises methyldiamine, ethylenediamine, or both.

20. The ink composition of claim 1, wherein the ink composition is substantially free of elemental silver particles.

21. The ink composition of claim 1, comprising the complexing agent and the silver salt a molar ratio not less than 4:1.

22. An ink composition for making a conductive silver structure, the ink composition comprising:
   a silver salt;
   a complexing agent for dissolving the silver salt, the complexing agent not being a reducing agent for the silver salt; and
   an acid for complexing with the complexing agent and reducing the silver salt;
   wherein each of the complexing agent and the acid has a boiling point of about 120° C. or less.

23. The ink composition of claim 22, further comprising a solvent having a boiling point of about 120° C. or less.

24. The ink composition of claim 22, wherein the complexing agent comprises a short chain diamine, and at least one of an alkyl amine and ammonia.

* * * * *